(12) United States Patent
Gonzalez Bohme et al.

(10) Patent No.: US 10,464,229 B2
(45) Date of Patent: Nov. 5, 2019

(54) DEVICE FOR CUTTING VOLUMES OF EXPANDED POLYSTYRENE FOAM OR SIMILAR, PRODUCING DOUBLE-CURVATURE SURFACES

(71) Applicant: UNIVERSIDAD TECNICA FEDERICO SANTA MARIA, Valparaiso (CL)

(72) Inventors: Luis Felipe Gonzalez Bohme, Concon (CL); Francisco Javier Quitral Zapata, Valparaiso (CL); Fernando Alfredo Auat Cheein, Vina del Mar (CL)

(73) Assignee: UNIVERSIDAD TECNICA FEDERICO SANTA MARIA, Valparaiso (CL)

( * ) Notice: Subject to any disclaimer, the term of this patent is extended or adjusted under 35 U.S.C. 154(b) by 94 days.

(21) Appl. No.: 15/559,090

(22) PCT Filed: Mar. 15, 2016

(86) PCT No.: PCT/CL2016/000013
§ 371 (c)(1),
(2) Date: Sep. 18, 2017

(87) PCT Pub. No.: WO2016/145545
PCT Pub. Date: Sep. 22, 2016

(65) Prior Publication Data
US 2018/0050460 A1   Feb. 22, 2018

(30) Foreign Application Priority Data
Mar. 18, 2015 (CL) .................................... 674-2015

(51) Int. Cl.
*B26F 3/12* (2006.01)
*B26D 1/00* (2006.01)
(Continued)

(52) U.S. Cl.
CPC ........... *B26D 1/0006* (2013.01); *B26D 3/006* (2013.01); *B26D 5/086* (2013.01); *B26D 7/0006* (2013.01);
(Continued)

(58) Field of Classification Search
CPC ........ B26D 1/006; B26D 3/006; B26D 7/006; B26D 5/086; B26D 7/26; B26D 3/08; B26F 3/08; B26F 3/12
See application file for complete search history.

(56) References Cited

U.S. PATENT DOCUMENTS

| | | | | | |
|---|---|---|---|---|---|
| 4,523,086 A | * | 6/1985 | Eilentropp | ........... | H01B 7/0823 219/549 |
| 4,683,791 A | * | 8/1987 | Demont | ................... | B26D 5/22 83/16 |

(Continued)

FOREIGN PATENT DOCUMENTS

| CN | 1935473 A | 3/2003 |
|---|---|---|
| CN | 201950705 U | 8/2011 |

(Continued)

OTHER PUBLICATIONS

International Search Report by the International Searching Authority for International Application No. PCT/CL2016/000013, dated Apr. 26, 2016 (4 pages) with English translation (4 pages). (8 pages total).

(Continued)

*Primary Examiner* — Kenneth E Peterson
*Assistant Examiner* — Liang Dong
(74) *Attorney, Agent, or Firm* — Daniel F. Nesbitt; Hasse & Nesbitt LLC

(57) ABSTRACT

Device for cutting double curvature surfaces into expanded polystyrene foam volumes comprising a first pair of linear guides; over each of the linear guides two pairs of plates (Continued)

arranged over skids are moving, where a horizontal beam connects each pair of plates; the two pairs of plates and the pair of horizontal beams; a block of material supported on the plates is displaced by a first pair by of step motors simultaneously activated; where the block of material in its movement faces a rectangular frame which is arranged perpendicularly to the movement path of the block, with the rectangular frame having a fixed position and a flexible foil, which is covered with a sheath of thermal and electrical insulation, over which a resistive heating wire is helically wound where electrical current heats the wire and vaporizes the zone previous to physical contact with the block of material during displacement.

9 Claims, 11 Drawing Sheets

(51) Int. Cl.
        *B26D 7/10*      (2006.01)
        *B26F 3/08*      (2006.01)
        *B26D 7/00*      (2006.01)
        *B26D 7/26*      (2006.01)
        *B26D 3/00*      (2006.01)
        *B26D 5/08*      (2006.01)
        *B23Q 15/08*     (2006.01)
        *B23Q 15/24*     (2006.01)
(52) U.S. Cl.
        CPC ............... *B26D 7/10* (2013.01); *B26D 7/26* (2013.01); *B26F 3/08* (2013.01); *B26F 3/12* (2013.01); *B23Q 15/08* (2013.01); *B23Q 15/24* (2013.01)

(56) References Cited

U.S. PATENT DOCUMENTS

| | | | |
|---|---|---|---|
| 4,693,792 | A | 8/1987 | Demont |
| 5,918,517 | A | 7/1999 | Malapert et al. |
| 6,167,624 | B1 | 1/2001 | Lanahan et al. |
| 2011/0314984 | A1 | 12/2011 | Stege |

FOREIGN PATENT DOCUMENTS

| | | | | |
|---|---|---|---|---|
| JP | 2001162597 A | 6/2001 | | |
| JP | 2010167546 A | 8/2010 | | |
| WO | WO-2004108435 A1 | * 12/2004 | ............. | B26D 1/553 |
| WO | 2013084252 A1 | 6/2013 | | |

OTHER PUBLICATIONS

Written Opinion by the International Searching Authority for International Application No. PCT/CL2016/000013, dated May 20, 2016 (5 pages) with English translation (6 pages). (11 pages total).

International Preliminary Report on Patentability by the International Searching Authority for International Application No. PCT/CL2016/000013, dated Sep. 19, 2017 (6 pages) with English translation (7 pages). (13 pages total).

Horvath, I., et al., "Tool profile and tool path calculation for free-form thick-layered fabrication", Comupter-Aided Design, 1998, 30(14), 1097-1110 (14 pages).

Broek, J.J., et al., "Free-form thick-layer object manufacturing technology for large-sized physical models", Automation in Construction, 2002, 11(3), 335-347 (13 pages).

De Smit, A., et al., "Validating algorithms for calculation of the shape of a flexible blade", International Journal of Machine Tools and Manufacture, 2006, 46(7-8), 890-900 (11 pages).

* cited by examiner

DEVICE FOR CUTTING VOLUMES OF EXPANDED POLYSTYRENE FOAM OR SIMILAR, PRODUCING DOUBLE-CURVATURE SURFACES

SCOPE

The present invention relates to a device that cuts double-curvature surfaces in expanded polystyrene foam (EPS) or the like for mass production of budding elements, molding, insulation, flotation, containment and other functions that express or produce aesthetic value. More specifically, it is a flexible, numerically-controlled hot foil cutting machine (sometimes referred to as hot "knife" cutting) that sections concave and convex surfaces simultaneously according to a computer previous design.

PRIOR ART DESCRIPTION

Today, the manufacture of products and components of expanded polystyrene or the like is mainly carried out using three methods: molding, milling and wire cutting or hot foil tensioning cutting. Molding is mainly used in the packaging industry; it requires the previous manufacture of a mold that allows multiplying objects to be produced, thus preventing mass production of different, large-sized components. Milling involves removing material by moving a milling cutter; it allows the production of complex geometries, such as double-curvature surfaces, but it generates excessive particulate matter remaining. Finally, the tensioned hot wire cutting (sometimes referred to as hot "wire" cutting) provides a quick and clean process, but being limited in geometric possibilities of manufacture, since it only allows the manufacture of geometries consisting of ruled surfaces. At industrial level, the expanded polystyrene is produced in the form of large blocks, which are subsequently divided depending on their application. For this sectioning process, automated machines are used; these machines move a generally tensioned hot wire through expanded foam polystyrene or the like, where the heat vaporizes the material just before making physical contact with it. However, the main limitation of using a tensioned hot wire is the restricted range of morphological possibilities of the products to be divided or sectioned.

The proposed invention allows sectioning blocks of expanded polystyrene or the like, for the manufacture of products and components of complex geometry, it reduces time and cost of manufacturing parts with double-curvature surfaces. The surplus of this process is mainly sections of manipulable size which facilitates reuse of waste material without shelling or suspended dust.

Patent US20110314984 (A1), dated Dec. 29, 2011, entitled "Method of producing test components by a hot wire cutter" Stege, describes a method for controlling a hot wire tensioned to form a three dimensional profile in a block of material. This procedure allows to measure and coordinate the wire ends, so that the active section performs the desired cut, considering the position of the material.

Patent CN1935473 (A), dated Mar. 28, 2003, entitled "Foam polymer material three-dimensional rapid shaping method and device using alloy hot wire as tool" Fang, describes a device and method using a hot wire as a cutter, combining translation and rotation movements both of the block of material and the cutter. It combines the technique of tensioned wire and preformed wire.

Patent WO2013084252 (A1) dated Jun. 13, 2013 entitled "CNC machining center for machining expanded materials", Caboni, describes a CNC machining center that combines preformed hot cutting foils, milling tools and tensioned hot wire, created for ICF (Insulating Concrete Form) panels. It includes a rotation process of the material for tensioned wire cutting, mainly for columns and capitals of complex geometry.

In conclusion, in the prior art there is not a device for the cutting of double curvature surfaces of expanded polystyrene or the like through the control of a flexible foil according to a compute previous design.

SUMMARY OF THE INVENTION

A device for cutting expanded polystyrene foam volumes or the like, obtaining double-curvature surfaces is proposed, comprising a first pair of linear guides; on each of the linear guides there are two pairs of plates arranged over skids moving, where each pair of plates is connected by a horizontal beam; the two pairs of plates and the pair of horizontal beams allow supporting and fixing a block of material of expanded polystyrene foam or the like for cutting; the block of material supported on the plates is displaced by a first pair of synchronous belts and pulleys, which are driven by a first pair of step rotors, which are simultaneously activated; where the block of material in its movement faces a rectangular frame which is arranged perpendicularly to the movement path of the block of material passing through this rectangular frame during cutting, with said rectangular frame having a fixed position and being supported on a horizontal frame having four support legs, whereby the cutting device remains sustained on the floor; where the rectangular frame has a flexible foil, which can be of steel or similar material; which is covered with a sheath of thermal and electrical insulation, over which a resistive heating wire is helically wound, through which an electrical current circulates that heats the resistive heating wire and vaporizes the zone that is previous to physical contact with the block of material during the displacement thereof, wherein the flexible foil is supported at its ends by crowns.

The rectangular frame is formed by four sides, and in its upper and lower sides, each one of them supports a vertical rail, where each vertical support rail has a step motor in its lower side that can be simultaneously or alternately activated; where each one of them moves a pinion to drive the crown, so as to have a reducing movement in the crown; each vertical support rail slides through skids fixed to a plate respectively, so as to obtain a vertical motion for each of the vertical support rail; each one of the plates is supported on a horizontal sliding plate respectively, so that they can move on the respective rail corresponding to the upper and lower sides of the rectangular frame respectively, which allows each vertical support rail to horizontally move within a limit lower to the length of the side; the vertical movements are transmitted through spindles rotated by step motors, which can be simultaneously or alternately activated; the horizontal movements are transmitted through synchronous pulleys and belts, which are rotated by step motors, which can be simultaneously or alternately activated.

The pinion that drives the crown, transmits the movement to the ends of the flexible foil, which can be of steel or similar material, which is covered by a heating and electric insulation sheath, over which a heating resistive wire is helically wound and through which an electrical current circulates that heats the resistive heating wire and vaporizes the zone that is previous to physical contact with the block of material during the displacement thereof.

During the process of cutting the block of material, the three spatial axes are controlled; thus, the cutting line forming the flexible foil varies during the advancement of the block of material on the Y axis, which corresponds to the movement of the block of material to the rectangular frame; the cutting process starts when the block of material faces the flexible foil; at the start of cutting the block of material, the shape of the flexible foil begins to vary on the X and Z axes; on the X axis, the ends of the flexible foil perform a parallel movement to the upper and lower sides of the rectangular frame respectively; this is done by the horizontal displacement of each vertical support rail by the step motors; on the Z axis, the ends of the flexible foil perform an orthogonal movement to the upper and lower sides of the rectangular frame respectively; this is done by means of the vertical displacement of the ends of each vertical support rail through the step motors; a combination of horizontal and vertical movements of the ends of each vertical support rail allows to give a particular shape to the flexible foil while cutting the block of material, wherein said particular shape may vary during the advance of the block of material on the Y axis; since the length of the flexible foil is fixed, the pinions that drive the crowns during the cutting process need to transmit a movement towards the ends of a flexible foil, so that to obtain a curvature with the particular shape; the movements of the entire cutting device are made by the step motors, which are controlled by a microprocessor that sends the signals to said step motors, according to parameter values on each X, Y, Z axes; where the control of parameters on each axis allows for different types of cutting curves to be obtained from the flexible foil; and prior to cutting, using a CAD J CAM software, the desired geometry is modeled and parameters for each cutting stage are calculated, where the cutting curve varies during the cutting process to obtain a double-curvature surface in a block of material; the software generates a text file that is sent to the machine-controlling microprocessor, which interprets each line of the code and translates those units into digital pulses that are sent to the step motors controllers.

DESCRIPTION OF A PREFERRED EMBODIMENT

Figure 1:
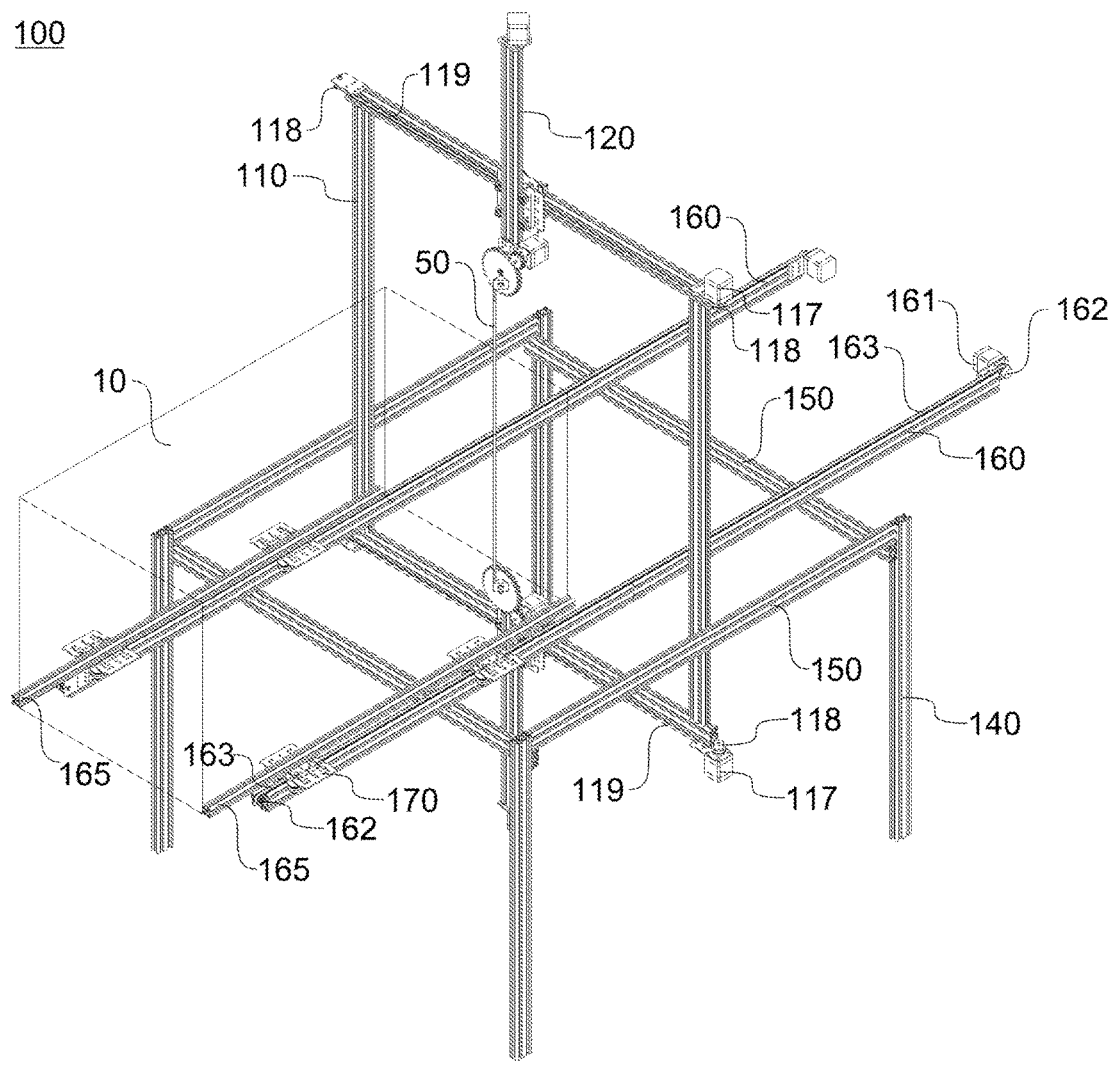
FIG. 1 describes a main isometric view of the invention,
FIG. 2 describes a front view of the invention.

The present invention relates to a device for cutting expanded polystyrene foam volumes or the like, obtaining double-curvature surfaces. FIG. 1 shows the cutting device (100) comprising a first pair of linear guides (160); on each of the linear guides (160) there are two pairs of plates (170) moving, arranged over skids moving, where each pair of plates (170) is connected by a horizontal beam (165); the two pairs of plates (170) and the pair of horizontal beams (165) allow supporting and fixing the block of material (10) for cutting; the block of material (10) supported on the plates (170) is displaced by a first pair of synchronous belts and pulleys, which are driven by a first pair of step motors (161), which are simultaneously activated.

Figure 2:
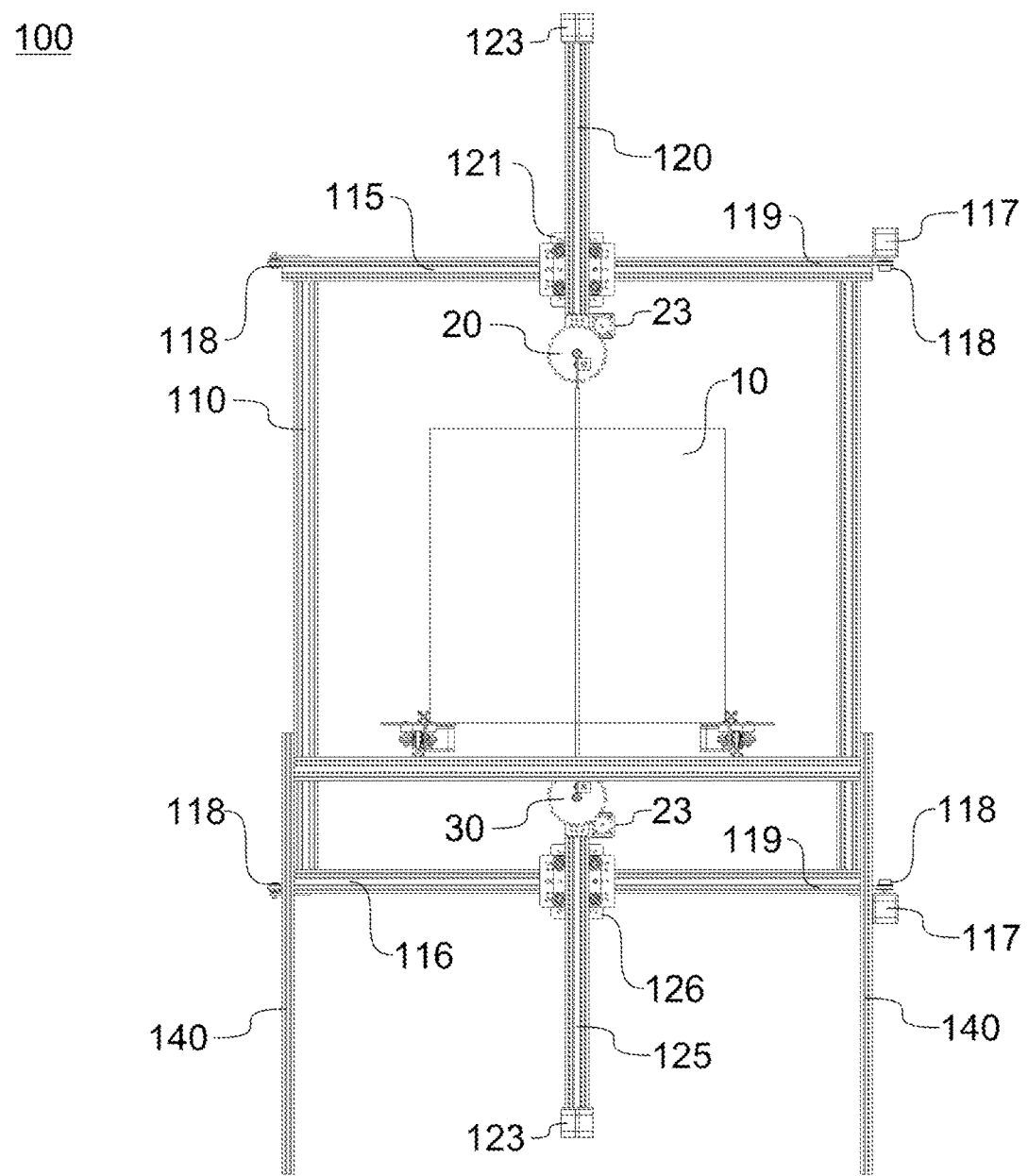
Figure 3:
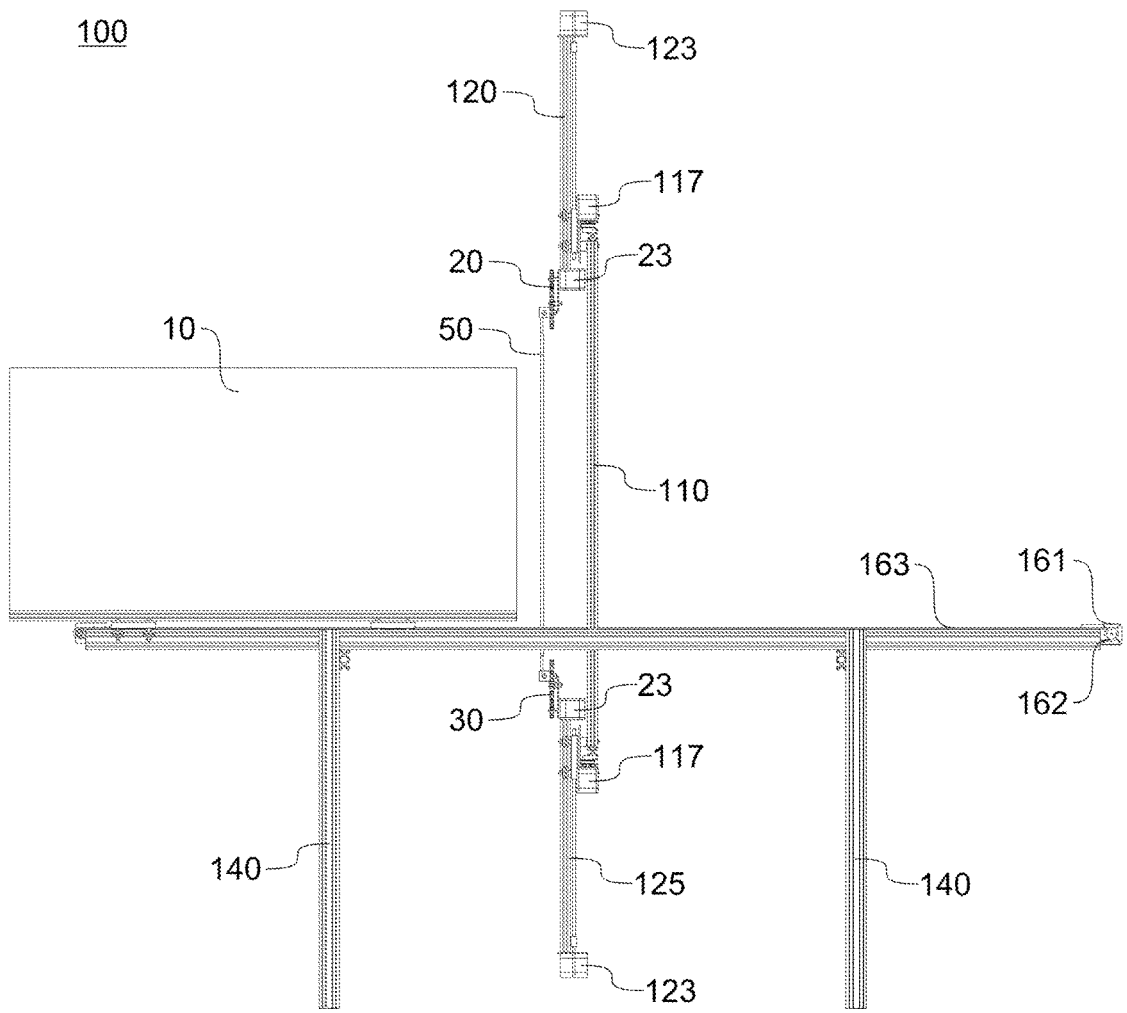
FIG. 3 describes a side view of the invention.
Figure 4:
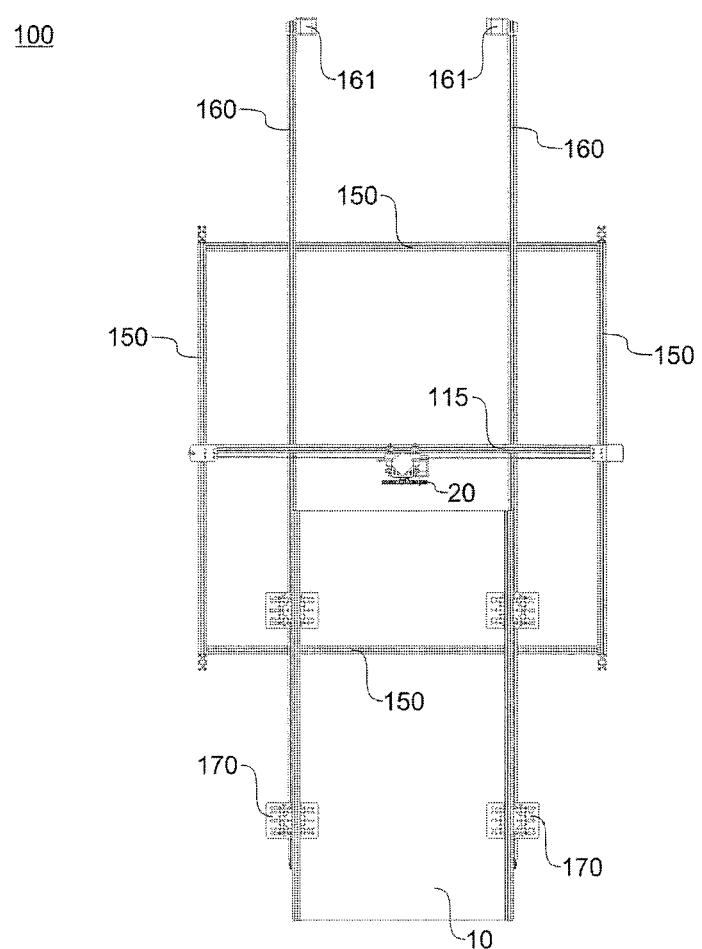
FIG. 4 describes a plan view of the invention.

In its movement, the block of material (10) faces a rectangular frame (110) which is arranged perpendicularly to the movement path of the block of material (10) passing through this rectangular frame (110) during the cutting, as shown by FIGS. 2 to 4. The rectangular frame (110) has a fixed position and is supported on a horizontal frame (150) having four support legs (140), whereby the cutting device (100) remains sustained on the floor.

Figure 5:
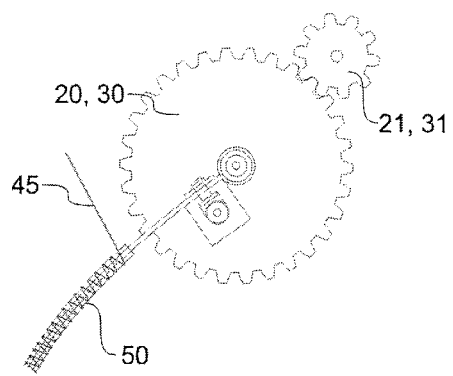
FIG. 5 describes a detail of the gear and of the flexible hot knife.

The rectangular frame (110) is formed by four sides, and in its upper and lower sides (115, 116), each one of them supports a vertical supporting rail (120, 125), where each vertical support rail (120, 125) has a step motor (23) in its lower side that can be simultaneously or alternately activated; where each one of them moves a pinion (21, 31) to drive a crown (20, 30), so as to have a reducing movement in the crown (20, 30), as shown in FIG. 5; each vertical support rail (120, 125) slides through skids fixed to a plate (121, 126) respectively, so as to obtain a vertical motion for each of the vertical support rails (120, 125); each one of the plates (121, 126) is supported on a horizontal sliding plate (122, 127) respectively, so that they can move on the respective rail corresponding to the upper and lower sides (115, 116) respectively of the rectangular frame (110); the configuration described above, as shown by FIG. 6, allows each vertical support rail (120, 125) to horizontally move within a limit lower to the length of the side (115, 116); the vertical movements are transmitted through spindles rotated by step motors (123), which can be simultaneously or alternately activated; the horizontal movements are transmitted through synchronous pulleys (118) and belts (119), which are rotated by step motors (117), which can be simultaneously or alternately activated.

The pinion (21, 31) that drives the crown (29, 30), transmits the movement to the ends of a flexible foil (50), which can be of steel or similar material, which is covered by a heating and electric insulation sheath, over which a heating resistive wire (45) is helically wound and through which an electrical current circulates that heats the resistive heating wire (45) and vaporizes the zone that is previous to physical contact with the block material (10) during the displacement thereof.

During the process of cutting the block of material (10), the three spatial axes are controlled; thus, the cutting line forming the flexible foil (50) varies during the advance of the block of material (10) on the Y axis, which corresponds to the movement of the block of material (10) to the rectangular frame (110); the cutting process starts when the block of material (10) faces the flexible foil (50) as shown in FIG. 3; at the start of cutting the block of material (10), the shape of the flexible foil (50) begins to vary on the X and Z axes; on the X axis, the ends of the flexible foil (50) perform a parallel movement to the upper and lower sides (115, 116) of the rectangular frame (110) respectively; this is done by the horizontal displacement of each vertical support rail (120, 125) by the step motors (117); on the Z axis, the ends of the flexible foil (50) perform an orthogonal movement to the upper and lower sides (115, 116) of the rectangular frame (110) respectively; this is done by means of the vertical displacement of the ends of each vertical support rail (120, 125) through the step motors (123); a combination of horizontal and vertical movements of the ends of each vertical support rail (120, 125) allows to give a particular shape to the flexible foil (50) while cutting the block of material (10), wherein said particular shape may vary during the advance of the block of material (10) on the Y axis; since the length of the flexible foil (50) is fixed, the pinions (21, 31) that drive the crowns (20, 30) during the cutting process need to transmit a movement towards the ends of a flexible foil (50), so that to obtain a curvature with the particular shape; the movements of the entire cutting device (100) are made by the aforementioned step motors (23, 117, 123, 161), which are controlled by a microprocessor that sends the signals to said step motors, (23, 117, 123, 161) according to parameter values on each X, Y, Z axes. The control of parameters on each axis allows for different types of cutting curves to be obtained from the flexible foil (50).

Figure 12:
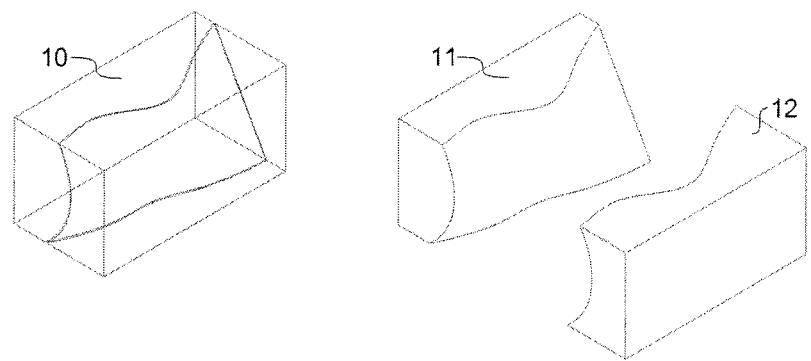
FIG. 12 describes the surface of the resulting double curvature in the block of material.

Prior to cutting, using a CAD CAM software, the desired geometry is modeled and parameters for each cutting stage are calculated. As an example, a sequence is shown in FIGS. 7 to 11 describing five stages where the cutting curve varies during the cutting process in order to obtain a double curvature surface in a block of material (10) as shown in FIG. 12. The software generates a text file that is sent to the machine-controlling microprocessor, which interprets each line of the code and translates those units into digital pulses. These pulses are sent to the step motors controllers.

The electric current heating the resistive heating wire (45) helically winding around the flexible foil (50) can be variable and only a waiting time is required until achieving the proper temperature to start cutting.

Figure 6:
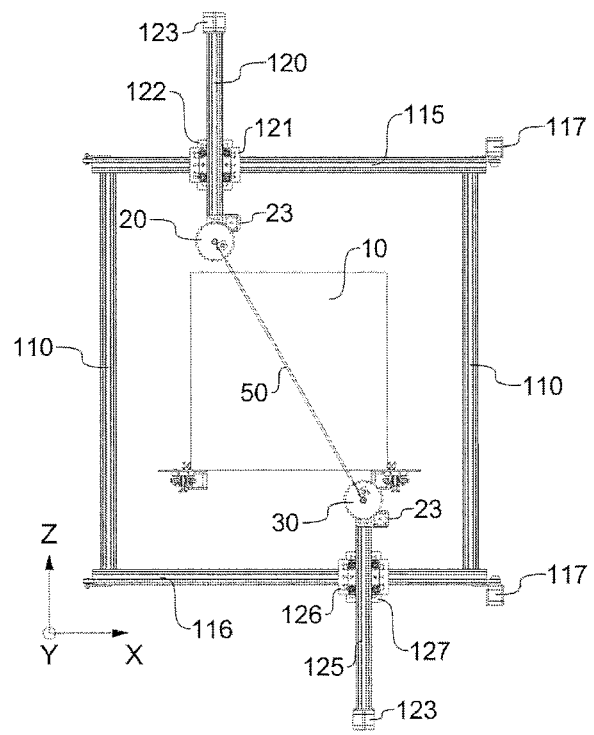
FIG. 6 describes a front view of the control elements of the flexible hot knife.
Figure 7:
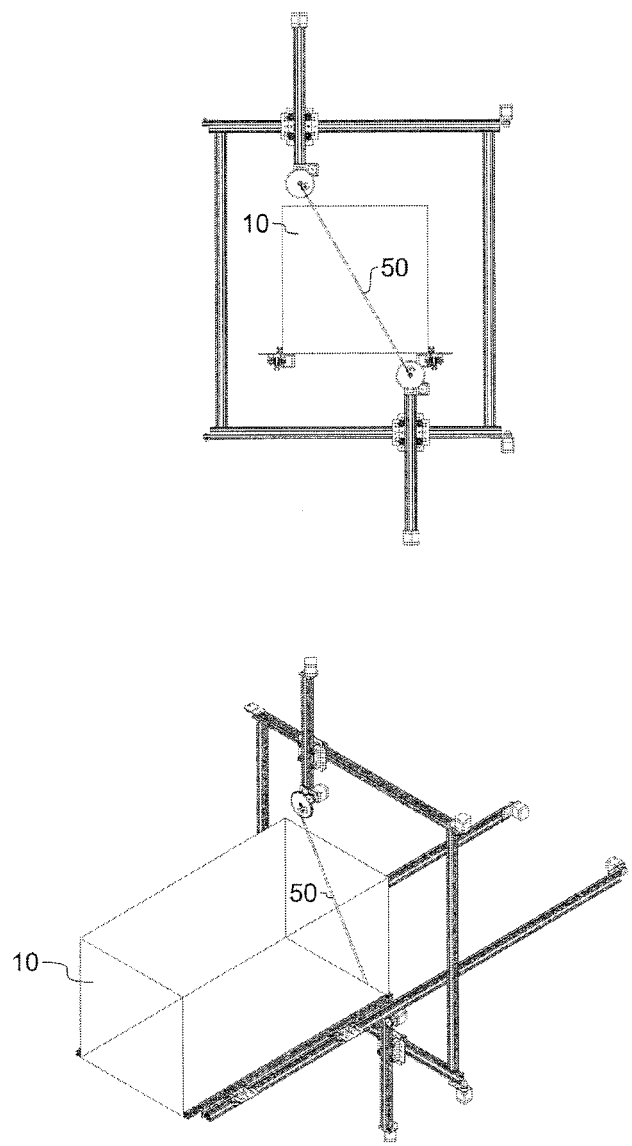
FIGS. 7, 8, 9, 10 and 11 describe the sequence of cutting curves along a block of material.
Figure 8:
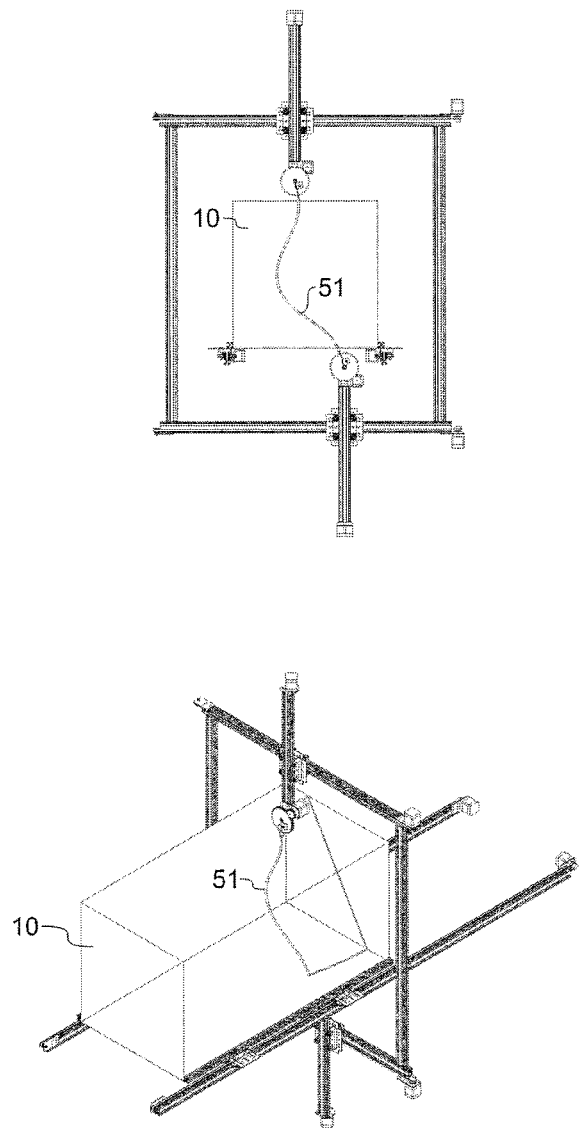
Figure 9:
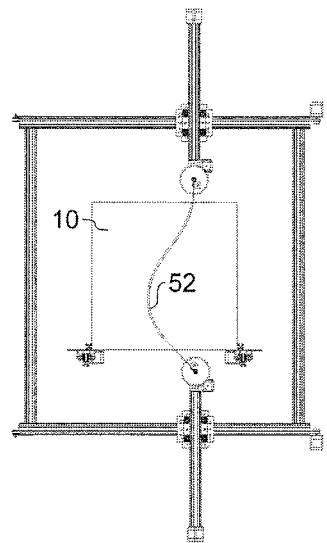
Figure 9:
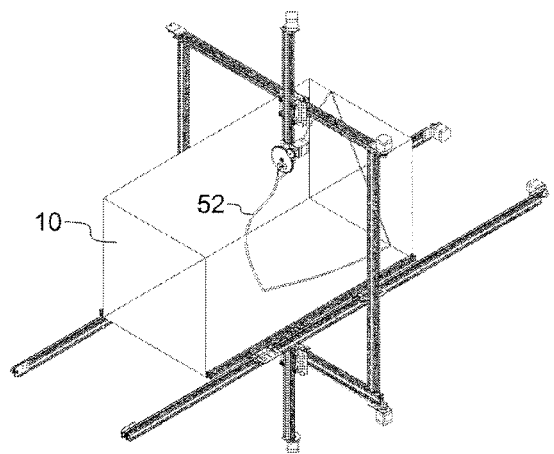
Figure 10:
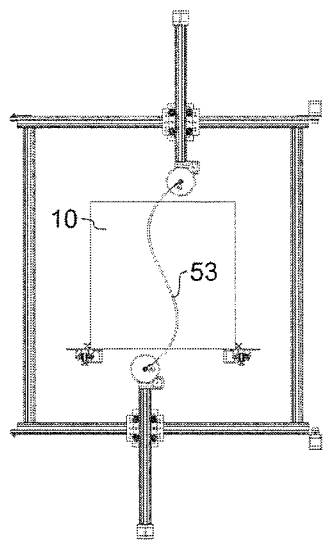
Figure 10:
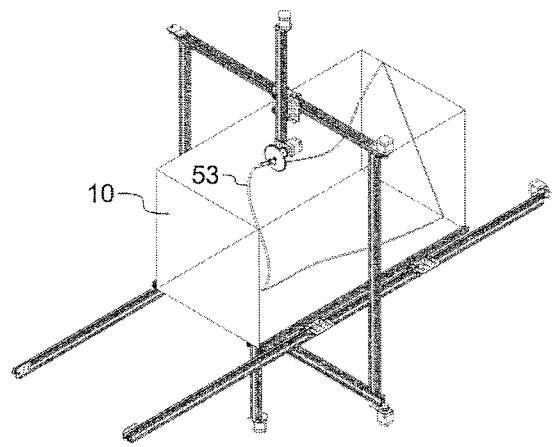
Figure 11:
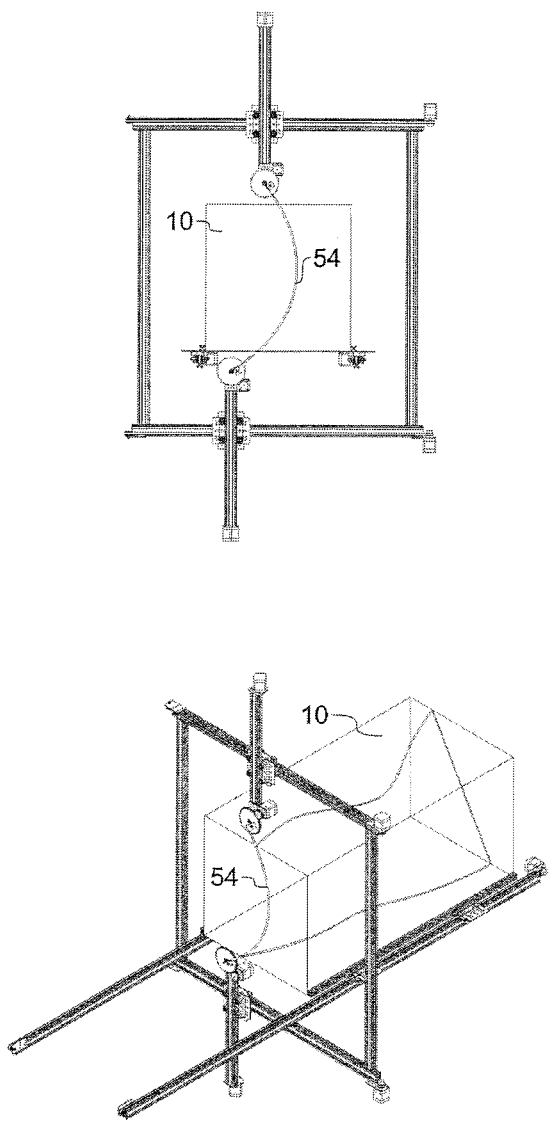

The cutting curve can take all possible shapes, and it can even be straight as shown in FIGS. 6 and 7; the flexible foil (50) is flat, this being why its profile is contained in the X Z plane. According to the complexity of geometry to be cut, the block of material (10) can move forwards and backwards during or at the end of each cutting passing.

The invention claimed is:

1. A device (100) for cutting expanded polystyrene foam volumes and obtaining double-curvature surfaces, comprising: a first pair of linear guides (160); over each of the linear guides (160), two pairs of plates (170) arranged over skids are moving, where each pair of plates (170) is connected by a horizontal beam (165); the two pairs of plates (170) and the pair of horizontal beams (165) allow supporting and fixing a block of material (10) of expanded polystyrene foam, for cutting; the block of material (10) supported on the plates (170) is displaced by a first pair of synchronous belts (163) and pulleys (162), which are driven by a first pair of step motors (161), which are simultaneously activated; where the block of material (10) in its movement faces a rectangular frame (110) which is arranged perpendicularly to the movement path of the block of material (10), passing through this rectangular frame during cutting, said rectangular frame (110) having a fixed position and being supported on a horizontal frame (150) having four support legs (140), whereby the cutting device (100) remains sustained on the floor; where the rectangular frame (110) has a flexible foil (50), which is covered with a sheath of thermal and electrical insulation, over which a resistive heating wire (45) is helically wound, through which an electrical current circulates that heats the resistive heating wire (45) and vaporizes the zone that is previous to physical contact with the block of material (10) during the displacement thereof.

2. The device (100) for cutting foam volumes according to claim 1, wherein the flexible foil (50) is sustained at its ends by crowns (20, 30).

3. The device (100) for cutting foam volumes according to claim 1, wherein the rectangular frame (110) is formed by four sides, and in its upper and lower sides (115, 116), each one of them supports a vertical rail (120, 125), where each vertical support rail (120, 125) has a step motor (23) in its lower side that can be simultaneously or alternately activated; where each one of them moves a pinion (21, 31) to drive the crown (20, 30), so as to have a reducing movement in the crown (20, 30); each vertical support rail (120, 125) slides through skids fixed to a plate (121, 126) respectively, so as to obtain a vertical motion for each of the vertical support rail (120, 125); each one of the plates (121, 126) is supported on a horizontal sliding plate (122, 127) respectively, so that they can move on the respective rail corresponding to the upper and lower sides (115, 116) of the rectangular frame (110) respectively, which allows each vertical support rail (120, 125) to horizontally move within a limit lower than the length of the side (115, 116); the vertical movements are transmitted through spindles rotated by step motors (123), which can be simultaneously or alternately activated; the horizontal movements are transmitted through synchronous pulleys (118) and belts (119), which are rotated by step motors (117), which can be simultaneously or alternately activated.

4. The device (100) for cutting foam volumes according to claim 3, wherein the pinion (21, 31) that drives the crown (20, 30), transmits the movement to the ends of the flexible foil (50).

5. The device (100) for cutting foam volumes according to claim 4, further comprising a microprocessor, wherein during the process of cutting the block of material (10), the three spatial axes are controlled by the microprocessor; thus, the cutting line forming the flexible foil (50) varies during the advancement of the block of material (10) on the Y axis, which corresponds to the movement of the block of material (10) to the rectangular frame (110); the cutting process starts when the block of material (10) faces the flexible foil (50); at the start of cutting the block of material (10), the shape of the flexible foil (50) begins to vary on the X and Z axes; on the X axis, the ends of the flexible foil (50) perform a parallel movement to the upper and lower sides (115, 116) of the rectangular frame (110) respectively; this is done by the horizontal displacement of each vertical support rail (120, 125) by the step motors (117); on the Z axis, the ends of the flexible foil (50) perform an orthogonal movement to the upper and lower sides (115, 116) of the rectangular frame (110) respectively; this is done by means of the vertical displacement of the ends of each vertical support rail (120, 125) through the step motors (117); a combination of horizontal and vertical movements of the ends of each vertical support rail (120, 125) allows to give a particular shape to the flexible foil (50) while cutting the block of material (10), wherein said particular shape may vary during the advance of the block of material (10) on the Y axis; since the length of the flexible foil (50) is fixed, the pinions (21, 31) that drive the crowns (20, 30) during the cutting process need to transmit a movement towards the ends of a flexible foil (50), so that to obtain a curvature with the particular shape.

6. The device (100) for cutting foam volumes according to claim 5, wherein the movements of the entire cutting device (100) are made by the step motors (23, 117, 123, 161), which are controlled by the microprocessor that sends the signals to said step motors (23, 117, 123, 161), according to parameter values on each X, Y, Z axes; where the control of parameters on each axis allows for different types of cutting curves to be obtained from the flexible foil (50).

7. The device (100) for cutting foam volumes according to claim 6, wherein prior to cutting, using a CAD/CAM software, the desired geometry is modeled and parameters for each cutting stage are calculated, where the cutting curve varies during the cutting process to obtain a double-curvature surface in a block of material (10); the software generates a text file that is sent to the machine-controlling microprocessor, which interprets each line of the code and translates those units into digital pulses that are sent to the microprocessor which is controlling the step motors.

8. The device (100) according to claim 4, wherein the flexible foil (50) is steel.

9. The device (100) according to claim 1, wherein the flexible foil (50) is steel.

* * * * *

UNITED STATES PATENT AND TRADEMARK OFFICE
CERTIFICATE OF CORRECTION

PATENT NO.      : 10,464,229 B2
APPLICATION NO. : 15/559090
DATED           : November 5, 2019
INVENTOR(S)     : Luis Felipe Gonzalez Bohme et al.

Page 1 of 1

It is certified that error appears in the above-identified patent and that said Letters Patent is hereby corrected as shown below:

In the Specification

Column 1, Line 10, delete "budding" and insert --building--.

Column 2, Line 25, delete "rotors" and insert --motors--.

Column 3, Line 32, delete "CAD J CAM" and insert --CAD/CAM--.

Column 5, Line 15, delete "CAD CAM" and insert --CAD/CAM--.

Signed and Sealed this
Seventeenth Day of December, 2019

Andrei Iancu
*Director of the United States Patent and Trademark Office*